United States Patent [19]

Sheasby et al.

[11] 3,873,318

[45] Mar. 25, 1975

[54] PRODUCTION OF LITHOGRAPHIC PLATES

[75] Inventors: Peter Geoffrey Sheasby, Banbury; Alan Martin Smith, Oxford; Christopher Robert Gilkes, Banbury; Wolf Dieter Breit, Llanhennock, all of England

[73] Assignee: Alcan Research and Development Limited, Montreal, Quebec, Canada

[22] Filed: June 1, 1973

[21] Appl. No.: 366,191

[30] Foreign Application Priority Data

June 8, 1972 United Kingdom ............ 26899/72

[52] U.S. Cl. .................... 96/86 P, 96/86 R, 117/34, 204/28, 204/38 A

[51] Int. Cl. ...... G03c 1/94, C23b 5/58, C23f 17/00

[58] Field of Search ...... 204/28, 38 A; 96/33, 86 R, 96/86 P

[56] References Cited

UNITED STATES PATENTS

| | | | |
|---|---|---|---|
| 3,079,308 | 2/1963 | Ramirez et al. | 204/28 |
| 3,181,461 | 5/1965 | Fromson | 96/86 R |
| 3,359,189 | 12/1967 | Cooke et al. | 204/28 |
| 3,359,190 | 12/1967 | Cooke et al. | 204/28 |
| 3,471,375 | 10/1969 | Cooke et al. | 204/28 |
| 3,511,661 | 5/1970 | Rauner et al. | 96/86 R |
| 3,692,640 | 9/1972 | Hamabe et al. | 204/28 |
| 3,718,547 | 2/1973 | Cooke et al. | 204/28 |
| 3,756,826 | 9/1973 | Zelley | 96/86 R |

FOREIGN PATENTS OR APPLICATIONS

| | | |
|---|---|---|
| 1,235,661 | 6/1971 | United Kingdom |

*Primary Examiner*—O. R. Vertiz
*Assistant Examiner*—Wayne A. Langel
*Attorney, Agent, or Firm*—Cooper, Dunham, Clark, Griffin & Moran

[57] ABSTRACT

A method of preparing aluminium for use in the production of lithographic plates in which after an optional electrolytic or mechanical treatment the aluminium in continuous strip form is subjected to anodisation to develop a soft, porous, flexible, anodic oxide coating having a thickness in the range of 0.1 – 1 micron, said anodisation being performed during the passage of said strip through an aqueous sulphuric acid anodisation electrolyte held at a temperature above 70°C, said strip being subjected during passage through said electrolyte to an electrolytic treatment for a period of 10 – 60 seconds and involving a charge input of at least 500 coulombs/sq.ft. preferably 1,500 – 5,000 coulombs/sq.ft.

3 Claims, No Drawings

PRODUCTION OF LITHOGRAPHIC PLATES

The present invention relates to the production of aluminium lithographic printing plates (sometimes known as planographic plates).

It is already well-known to apply a light-sensitive coating to an aluminium plate and to form hydrophobic image areas on the plate by exposing the coating to light through a negative and removing the non-image areas from the plate in the course of development. The hydrophobic image areas of the plate are then able to accept greasy printing inks, whilst the areas of the plate, from which the coating has been removed, remain essentially hydrophilic and do not accept printing inks of the types employed in lithographic printing.

It is well-known to roughen the surface of the plate by mechanical or chemical treatments both for the purpose of improving the adhesion of the coating to the plate and for improving the hydrophilic characteristics of the plate surface.

Thus low cost aluminium lithographic plates may be produced by etching in sodium phosphate or by sandblasting and dipping in sodium silicate, as a pretreatment before coating with light-sensitive material. These treatments are effective for plates employed in short runs (5–25 thousand prints) and where print quality is of lesser importance.

The adhesion of the coating in image areas and the water-retaining capacity of the non-image areas are both improved by roughening the surface of the plate. For this purpose aluminium plates are frequently grained, either by an electrolytic treatment or by brush-graining with a wire brush or by slurry-brushing which involves the use of a nylon brush in conjunction with pumice as an abrasive. Electrolytic graining is preferred for the highest quality because the graining is non-directional (as compared with brush-graining).

Particularly when these fine graining treatments are employed, it is found that a big improvement in plate life is obtained if the surface of the plate is anodised after the graining treatment, the anodic oxide film providing satisfactory hydrophilic properties to the uncoated areas and a durable support to the hydrophobic image areas, resulting from the final development of the applied light-sensitive coating.

It has been normal to apply an anodic oxide film of 5 microns thickness to an aluminium lithographic plate by first degreasing the aluminium in conventional manner and then carrying out the anodisation in 15% sulphuric acid at a temperature of about 20° – 25°C, the treatment time being about 10 minutes. Because of the relatively long treatment time this has been performed as a conventional batch anodising treatment. The porous anodic oxide film produced by the anodising treatment is also found to have superior hydrophilic properties to a grained surface, which has not been subjected to an anodising treatment. However, it will be understood that lithographic plates produced in that way are relatively expensive because of the cost of the anodic oxidation treatment.

It has also been proposed to prepare the surface of an aluminium lithographic plate by forming a very thin layer of boehmite, aluminium oxide monohydrate, on it by treatment in steam or hot water under neutral conditions in deionised water.

The formmation of the boehmite layer may be somewhat accelerated by the inclusion of ammonia or an organic amine, which assist in the removal of residual oils and greases adsorbed on the surface of the plate. According to a later proposal it is preferred to carry out the process in hot deionised water without alkaline addition, whilst passing a current between the plate and electrodes submerged in the water. Because of the absence of ionic addition to the water, the current density in such treatment is very low and the coating formed on the metal is of a different nature from that produced by anodisation in sulphuric acid.

In British Pat. No. 1,235,661 there is described a process in which the surface of a continuous aluminium strip, without any prior degreasing treatment to remove rolling lubricant, is prepared to receive a protective lacquer by passing the strip through a hot sulphuric acid electrolyte maintained at about 90°C and in which spaced electrodes are positioned out of contact with the strip. Alternating current flows between the electrodes via the passing strip at a high current density of the order of 100 amps/sq. ft. (about 10 amps/dm$^2$). In that way an anodic oxide film can be built up of the order of 0.05 microns in thickness with a dwell time of 2–5 seconds in the electrolytic treatment zone. Even more rapid treatments for the electrolytic treatment of aluminium to receive protective lacquers have been described in U.S. Pat. application Ser. No. 89,862 now U.S. Pat. No. 3,718,547. In that treatment the surface of the metal is rendered successively cathodic, anodic and finally cathodic during passage of the moving strip through the sulphuric acid bath.

It has been found by examination with the electron microscope that the very thin anodic oxide film produced by these two processes is characterised by the presence of a large number of pits of a size of 300–400 A, which we have postulated are the cause of the excellent adhesion of protective lacquers to the aluminium strip subjected to the pretreatment described in British Pat. No. 1,235,661. However, when the pretreated material was tested for suitability as a base for coating with a light-sensitive material, it was found unsatisfactory.

We have, however, now found surprisingly that extremely satisfactory results can be obtained with aluminium, which has been anodised in hot sulphuric acid at a temperature in excess of 70°C and preferably at a temperature in the range of 80° – 90°C, provided that the pretreatment is continued until the thickness of the anodic oxide film is at least 0.1 micron and is most preferably in the range of about 0.5 micron or even up to 1 micron thickness. It is found that with anodic oxide films produced in this way the results obtained when the material is employed in a lithographic plate is at least equal to and frequently superior to those achieved with lithographic plates on which a much thicker anodic oxide film has been formed by conventional sulphuric acid anodising at a relatively low temperature.

We have found that suitable surfaces for application of photosensitive materials may be developed on aluminium with great rapidity when anodisation is performed in a continuous process in which the strip is passed through an aqueous sulphuric acid electrolyte at a temperature above 70°C and preferably in the range of 80° – 90°C whilst being subjected to alternating current or to direct current in circumstances such that the strip is initially cathodic and subsequently anodic and preferably finally cathodic, so that in the first part of its travel through the bath, the strip is subjected to electrolytic cleaning. In order to build up a sufficiently heavy anodic film for the production of a lithographic plate having an extended service life in a continuous process heavy current densities are applied. During its transit through the treatment chamber the strip is preferably subject to a charge input of at least 500 coulombs/sq. ft. and more preferably at least 1,500 coulombs/sq. ft. and still more preferably about 3,000 coulombs/sq. ft. The duration of the anodisation treatment should be at least 10 seconds and it is preferred that the current density should be at least 150 amps/sq. ft. Whilst there is no upper limit of time for continuance of the anodising treatment, economic considerations set up an upper limit of about 60 seconds. The upper limits of the current density are determined by the danger of burning the surface of the aluminium by reason of excessive temperature rise. Whilst higher current densities may be employed, the maximum that would be used in commercial production would be about 1,000 amps/sq. ft. and more usually a value below 500 amps/sq. ft., such as about 150 – 250 amps/sq. ft. is preferred. Ordinarily the upper limit of the charge input would be about 5,000 coulombs/sq. ft. for reasons of economy.

The a.c. or d.c. pretreatment process degreases the aluminium sheet, producing a clean surface with a thin, uniform, porous, anodic oxide film. Unlike a conventional anodic film, which cracks and crazes upon deformation, the thin anodic pretreatment film is flexible and does not crack or become detached from the metal on deformation. The oxide film formed under the conditions described above is about 0.3 – 0.5 microns thick, as measured by a scanning electron microscope, with a cell size of about $0.05\mu$ and a pore diameter of about $0.02\mu$. In contradistinction to the processes developed for improving the adhesion of protective lacquers, the film does not exhibit the presence of larger pits having a diameter in the range of 0.03 – 0.04 microns.

The anodic film produced under these pretreatment conditions can be used for lithographic applications either alone or in combination with a preceding electrograining or brushing. The anodising treatment may be followed by a further chemical treatment of the surface, such as silicating (e.g., when using negative-working diazo-based wipe-on coatings).

The concentration of the sulphuric acid electrolyte and any sulphuric acid concentration conventionally employed in anodising may be employed. Thus the sulphuric acid electrolyte may contain, for example, 5 – 30% sulphuric acid by weight.

The advantage of the electrolytic pretreatment process compared to the conventional anodising process is its low cost due to the short process time used and other advantages resulting from continuous coil processing which gives a large output at low cost compared with the conventional anodising process which is normally carried out as a batch process.

EXAMPLE I

Aluminium 99.5% purity and 0.3 mm (0.012 in.) thick in continuous strip form was grained by brushing with rotating oscillating nylon brushes while a slurry of pumice and water was sprayed on to the surface of the strip. This was carried out on a slurry-brushing machine manufactured by the Fuller Brush Company of Hartford, Conn., U.S.A. The strip was then a.c. pretreated by drawing it through a bath containing 15% by weight sulphuric acid at 80°C. Its dwell time in the bath was 15 seconds and it was subjected to alternating current at about 20 amps/sq. dm. (200 amps/sq. ft.) and 8 volts. The pretreated strip was rinsed and then immersed in a 5% by weight solution of sodium silicate at 80°C for one minute, thoroughly rinsed and dried and cut into sheets. A negative-working diazo wipe-on coating, sold by the Western Litho Plate and Supply Co. of St. Louis, Mo., U.S.A., was applied, exposed through a negative and developed. A lithographic plate was obtained which gave a strong image and clean non-image areas. It was found that this plate had a service life of > 50,000 copies without losing its clarity.

EXAMPLE II

Aluminium sheet 99.0% pure and 0.15 mm (0.006 in.) thick in continuous strip was a.c. pretreated by passage through 15% by weight sulphuric acid at 80°C for 15 seconds at about 20 amps/sq. dm. (200 amps/sq. ft.) and 8 volts. The strip was thoroughly rinsed and dried. A light-sensitive coating of the polyvinyl cinnamate type sold under the trade name KPR by Kodak Limited, London, England, was applied to sheets cut from this strip, exposed through a negative and developed. Proof prints were obtained from the plate which showed strong image and clean non-image areas. It was found that this plate had a service life of >40,000 copies without losing image clarity.

In a further series of tests it was found that with the same coating the current density may be reduced to about 5 amps/sq. dm. (50 amps/sq. ft.) for a treatment time of 10 – 20 seconds to provide plates having a service life of 30,000 – 50,000 impressions but when treatment times were reduced below 10 seconds the number of impressions obtainable was much reduced.

In further trials aluminium strip (99.5% purity) was subjected to slurry-brushing, as described in Example 1, and then subjected to a.c. pretreatment in 15% sulphuric acid at 80°C for 15 seconds at 15 amps/sq. dm. (150 amps/sq. ft.). Sheets cut from the pretreated aluminium were coated with a positive-working presensitising diazo-type coating. The coated sheets were exposed through a positive and developed. The resulting lithographic plates had a service life of about 50,000 copies.

We claim:

1. A method of preparing aluminium for use in the production of lithographic plates in which after an optional electrolytic or mechanical treatment the aluminium in continuous strip form is subjected to anodisation to develop a soft, porous, flexible, anodic oxide coating having a thickness in the range of 0.1 – 1 micron and essentially free of pits in a size range of 0.03 – 0.04 micron, said anodisation being performed during the passage of said strip through an aqueous sulphuric acid anodisation electrolyte held at a temperature above 70°C, said strip being subjected during passage through said electrolyte to an electrolytic treatment for a period of 10 – 60 seconds and involving a charge input of at least 500 coulombs/sq. ft.

2. A method according to claim 1 in which the charge input during the electrolytic anodisation treatment is in the range of 1,500 – 5,000 coulombs/sq. ft.

3. A method of producing lithographic plates which comprises subjecting aluminium in continous strip form to anodisation, after an optional electrolytic or mechanical roughening treatment, to develop a soft, porous, flexible, anodic oxide coating having a thickness in the range of 0.1 – 1 micron and essentially free of pits in a size range of 0.03 – 0.04 micron, said anodisation being performed during the passage of said strip through an aqueous sulphuric acid anodisation electrolyte held at a temperature above 70°C, said strip being subjected during passage through said electrolyte to an electrolytic treatment for a period of 10 – 60 seconds and involving a charge input of at least 500 coulombs/sq. ft., and applying to said anodic oxide coating a light-sensitive coating of a type which changes between a hydrophobic state and a hydrophilic state on exposure to light.

* * * * *